United States Patent Office 2,766,171
Patented Oct. 9, 1956

2,766,171

3-HALO-2-TETRAHYDROPYRANTHIOL S - (O,O-DI-ALKYL PHOSPHORODITHIOATE) AND PESTICIDES CONTAINING THE SAME

William R. Diveley, Brookside Park, Newark, Del., assignor to Hercules Powder Company, Wilmington, Del., a corporation of Delaware No Drawing. Application August 30, 1955, Serial No. 531,604

16 Claims. (Cl. 167—33)

This invention relates to new and useful organic dithiophosphate compounds and to pesticidal compositions containing the same.

The novel organic dithiophosphate compounds of this invention have the general formula

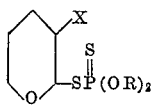

in which X is a halogen and each R represents a lower alkyl radical.

These organic dithiophosphate compounds have pesticidal properties and distinguish themselves in being highly toxic at low concentrations toward certain pests.

The organic dithiophosphate compounds of this invention are made by reacting 2,3-dihalotetrahydropyran with the desired diester of dithiophosphoric acid, the latter being the product of reaction of an alcohol or a mixture of alcohols of the formula ROH in which R is an alkyl radical of 1-4 carbon atoms and $P_2S_5$. The diester of dithiophosphoric acid may be reacted directly with the 2,3-dihalotetrahydropyran, but it is more satisfactorily reacted in the form of its salt or in the presence of materials which sequester the hydrogen chloride set free in the reaction. The 2,3-dihalotetrahydropyran used is not limited to that produced by any particular process.

The methods of making the products of this invention and methods of using the products as pesticides are more particularly described in the following examples in which all parts and percentages are by weight.

Example 1

To a solution of 2,3-dibromotetrahydropyran obtained by adding 30.0 parts bromine to 16.8 parts dihydropyran at 0° C. in carbon tetrachloride solution was added dropwise with stirring at 10° C. a solution of 37.2 parts O,O-diethyl hydrogen phosphorodithioate in 200 parts benzene containing 15.8 parts pyridine and a trace of hydroquinone. The solution was allowed to gradually warm up to room temperature over a period of 16 hours. Pyridine hydrobromide which separated was filtered off and the filtrate was washed with aqueous sodium carbonate and then with fresh water. After drying over sodium sulfate, the solvents were removed under reduced pressure up to 50° C. at 1 mm. pressure. The resulting residue of 3-bromo-2-tetrahydropyranthiol S-(O,O-diethyl phosphorodithioate) amounting to 60.0 parts analyzed as follows: $n_D^{20}$ 1.5460; S, 18.3%; P, 8.9%; Br, 22.1%. This was shown to be an insecticidal toxicant by tests indicated below.

Example 2

A solution of 30 parts potassium O,O-diisopropyl phosphorodithioate and 9.3 parts 2,3-dichlorotetrahydropyran in 200 parts methanol was heated at about 65° C. under reflux for 6 hours. The resulting product was cooled, diluted with ether and washed with water. The ether layer was separated and dried over anhydrous sodium sulfate. The residue after distilling off the ether was a yellow liquid of 3-chloro-2-tetrahydropyranthiol S-(O,O-diisopropyl phosphorodithioate) amounting to 16.0 parts. It analyzed 10.6% Cl and 19.2% S. This was shown by tests to be an insecticidal toxicant.

Example 3

3-chloro-2-tetrahydropyranthiol S-(O,O-diethyl phosphorodithioate) was prepared from 2,3-dichlorotetrahydropyran and O,O-diethyl hydrogen phosphorodithioate following the procedure of Example 1. It analyzed 11.3% P. This was shown by tests to be an insecticidal toxicant.

Example 4

3-chloro-2-tetrahydropyranthiol S-(O,O-dimethyl phosphorodithioate) was prepared from 2,3-dichlorotetrahydropyran and O,O-dimethyl hydrogen phosphorodithioate following the procedure of Example 1. This was shown by tests to be an insecticidal toxicant.

Example 5

3-chloro-2-tetrahydropyranthiol S-(O,O-di-sec-butyl phosphorodithioate) was prepared from 2,3-dichlorotetrahydropyran and O,O-di-sec-butyl hydrogen phosphorodithioate following the procedure of Example 1. This was shown by tests to be an insecticidal toxicant.

An emulsifiable concentrate of the residue was made by mixing 1 gram of the product of each of the above examples with 1 ml. benzene and 1 ml. sorbitan monolaurate polyoxyalkylene derivative (Tween 20). This concentrate was then diluted with water to form dispersions of the residue in water varying in concentration from 1.0% to 0.025%. The dispersions were then tested for their toxicity to caged insects and to mites not only by spraying the insects but by spraying the plants alone as well for the purpose of determining residual toxicity. Standard test methods were used for obtaining the results set forth below.

When pea aphids were sprayed with a 0.1% emulsion of the compositions of these examples and placed on pea seedlings sprayed simultaneously with the same emulsion, there resulted 80–100% mortality in 48 hours for the toxicants of Examples 1–4 and 60–80% mortality for the toxicant of Example 5.

Activity tests were also run by spraying lima bean seedlings infested with two-spotted mites to run off with 0.05% aqueous emulsion. There resulted 60–80% mortality to the mites after five days for the toxicants of Examples 1–4 and 60–80% mortality for the toxicant of Example 5.

A 0.1% dispersion of the toxicant of Example 3 gave an 80–100% kill of Mexican bean beetles in standard tests.

The organic dithiophosphate compounds of the formula

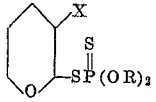

are those in which each R in the

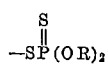

group is the same or a different lower alkyl radical such as methyl, ethyl, propyl or butyl, and X is a halogen. The preferred compounds are those containing lower alkyl radicals having 1–4 carbon atoms and bromine or chlorine as the halogen. The compounds which are especially effective as pesticides are those in which the halogen is chlorine and the R group has 1–3 carbon atoms in the radical.

In producing the compounds of this invention, the reaction between the 2,3-dihalotetrahydropyran and the ester of dithiophosphoric acid or its salt is carried out by heating the two reactants at a temperature at which reaction takes place but below the decomposition temperature in the range of 0° to 200° C., preferably in the range of 10–50° C. for the dibromotetrahydropyran and 30–110° C. for the dichlorotetrahydropyran. In order to get complete reaction, it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

In the case of 2,3-dichlorotetrahydropyran, the halogen in the 3-position is inactive as compared to the halogen in the 2-position, and it is easily possible to avoid replacing the 3-chlorine. In the case where bromine is in the 3-position, the reaction temperature must be kept below a temperature of about 50° C. to avoid partial substitution of the 3-bromine.

The reaction is preferably carried out in nonaqueous media. Organic solvents are desirable to aid in control of the reaction. Suitable solvents include benzene, toluene, xylene, anhydrous alcohol solvents and dioxane. It is preferable to use aromatic hydrocarbon solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the 2,3-dihalotetrahydropyran, hydrogen halide which is liberated is preferably sequestered by adding a material to combine with the hydrogen halide as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the 2,3-dihalotetrahydropyran as in Example 1. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive aromatic hydrocarbon solvents. When the free acid is reacted with the dihalotetrahydropyran, the alkaline material is preferably added gradually as needed but it can be added all at once if desired. Ammonia is suitably added gradually as a gas, the solids are suitably added in finely divided form.

The dithiophosphoric acid ester is produced by reacting the lower aliphatic alcohol, which is to form a part of the ester, with $P_2S_5$, preferably in a nonreactive solvent such as benzene, toluene, xylene, and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the 2,3-dihalotetrahydropyran. The esters of dithiophosphoric acid used in preparation of the compounds of this invention are thus made from individual alcohols or mixtures of alcohols having 1–4 carbon atoms. Included among such alcohols are methanol, ethanol, propanol-1, and propanol-2.

The methods by which the products of this invention are isolated will vary slightly with the reactants used and the product produced. In some instances, the chloride salt split out in the reaction separates and can be filtered off. In other instances, the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum and the like in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions or solutions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient amounts of organic solvents to aid in effective dispersion. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (Donald E. H. Frear, Second Edition (1948), pages 280–287) for use with known insecticides and include neutral soaps of resin, alginic and fatty acids and alkali metals or alkylamines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, china clay, kaolin, Attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will, in some instances, have more than one surface-active dispersing agent for a particular type of utility, or in addition to the surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. As a new composition of matter a compound of the formula

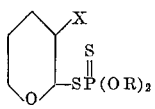

in which each R represents an alkyl radical having 1–4 carbon atoms and X represents a halogen of the group consisting of chlorine and bromine.

2. As a new composition of matter a compound of the formula

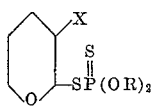

in which each R represents a different alkyl radical having 1–4 carbon atoms and X represents a halogen of the group consisting of chlorine and bromine.

3. As a new composition of matter a compound of the formula

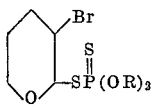

in which each R represents an alkyl radical having 1–4 carbon atoms.

4. As a new composition of matter a compound of the formula

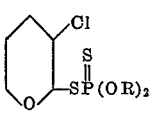

in which each R represents an alkyl radical having 1–4 carbon atoms.

5. As a new composition of matter a compound of the formula

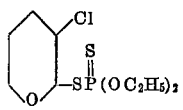

6. As a new composition of matter a compound of the formula

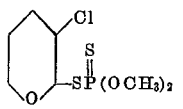

7. As a new composition of matter a compound of the formula

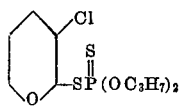

8. A pesticidal composition comprising a compound of claim 1 and an insecticidal adjuvant.

9. A pesticidal composition comprising a compound of claim 2 and an insecticidal adjuvant.

10. A pesticidal composition comprising a compound of claim 3 and an insecticidal adjuvant.

11. A pesticidal composition comprising a compound of claim 4 and an insecticidal adjuvant.

12. A pesticidal composition comprising the compound of claim 5 and an insecticidal adjuvant.

13. A pesticidal composition comprising the compound of claim 6 and an insecticidal adjuvant.

14. A pesticidal composition comprising the compound of claim 7 and an insecticidal adjuvant.

15. As a new composition of matter a compound of the formula

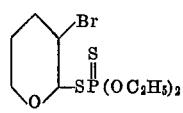

16. As a new composition of matter a compound of the formula

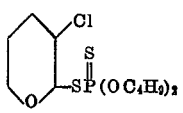

References Cited in the file of this patent
UNITED STATES PATENTS

| | | |
|---|---|---|
| 2,725,327 | Diveley | Nov. 29, 1955 |
| 2,725,331 | Haubein | Nov. 29, 1955 |
| 2,725,333 | Buntin | Nov. 29, 1955 |